(12) United States Patent
Condello et al.

(10) Patent No.: US 12,287,490 B2
(45) Date of Patent: Apr. 29, 2025

(54) APPARATUS AND METHODS FOR CONTROLLING HEATING OF AN OBJECTIVE IN A LINESCANNING SEQUENCING SYSTEM TO IMPROVE RESOLUTION

(71) Applicant: ILLUMINA, INC., San Diego, CA (US)

(72) Inventors: Danilo Condello, New York, NY (US); Dakota Watson, San Diego, CA (US); Andrew Carson, Carlsbad, CA (US); Vincent Hsieh, San Diego, CA (US); Steven Boege, San Mateo, CA (US); Changqin Ding, Foster City, CA (US); Stanley Hong, Menlo Park, CA (US)

(73) Assignee: Illumina, Inc., San Diego, CA (US)

( * ) Notice: Subject to any disclaimer, the term of this patent is extended or adjusted under 35 U.S.C. 154(b) by 246 days.

(21) Appl. No.: 17/981,206

(22) Filed: Nov. 4, 2022

(65) Prior Publication Data

US 2023/0143682 A1     May 11, 2023

Related U.S. Application Data

(60) Provisional application No. 63/282,555, filed on Nov. 23, 2021, provisional application No. 63/277,992, filed on Nov. 10, 2021.

(51) Int. Cl.
| | | |
|---|---|---|
| G02B 27/09 | (2006.01) | |
| G01N 21/64 | (2006.01) | |
| G02B 26/10 | (2006.01) | |

(52) U.S. Cl.
CPC ..... *G02B 27/0927* (2013.01); *G01N 21/6428* (2013.01); *G01N 21/6456* (2013.01);
(Continued)

(58) Field of Classification Search
CPC ............. G02B 27/0927; G02B 26/101; G02B 27/0916; G02B 27/0955; G02B 27/0994;
(Continued)

(56) References Cited

U.S. PATENT DOCUMENTS

| | | | |
|---|---|---|---|
| 9,377,566 B1* | 6/2016 | Martinsen | G02B 27/0966 |
| 2005/0046849 A1* | 3/2005 | Cromwell | G02B 21/0076 |
| | | | 356/417 |

(Continued)

FOREIGN PATENT DOCUMENTS

| | | |
|---|---|---|
| CN | 109444053 B | 10/2020 |
| KR | 10-2014-0081159 A | 7/2014 |

*Primary Examiner* — Dani Fox
*Assistant Examiner* — Mamadou Faye
(74) *Attorney, Agent, or Firm* — Illumina, Inc.

(57) ABSTRACT

Apparatus and methods for controlling heating of an objective in a linescanning sequencing system to improve resolution are disclosed. In accordance with a first implementation, an apparatus includes or comprises a beam source for providing input radiation and a beam shaping group including or comprising one or more optical elements positioned to receive the input radiation from the beam source, and to perform beam shaping on the input radiation to form a shaped beam. The apparatus further including or comprising an objective positioned to receive the shaped beam and to transform the shaped beam into a probe beam and configured to provide the probe beam to a focal plane of the objective for optically probing a sample. The beam shaping group is configured to adjust one or more properties of the shaped beam over time to generally uniformly heat the objective over a region of incidence for the shaped beam.

26 Claims, 11 Drawing Sheets

(52) U.S. Cl.
CPC ....... *G02B 26/101* (2013.01); *G02B 27/0916* (2013.01); *G02B 27/0955* (2013.01); *G02B 27/0994* (2013.01); *G01N 2021/6439* (2013.01)

(58) Field of Classification Search
CPC ........ G02B 7/008; G02B 7/028; G02B 26/10; G02B 27/09; G02B 27/0911; G02B 27/0972; G01N 21/6428; G01N 21/6456; G01N 2021/6439; G01N 21/645; H05B 3/0033
See application file for complete search history.

(56) References Cited

U.S. PATENT DOCUMENTS

| | | |
|---|---|---|
| 2012/0080616 A1 | 4/2012 | Schoenborn |
| 2018/0258468 A1 | 9/2018 | Sun et al. |
| 2019/0310464 A1* | 10/2019 | Janes ................. G02B 17/0621 |
| 2022/0197002 A1* | 6/2022 | Cang ................... G02B 21/006 |

* cited by examiner

800

820

840

860

APPARATUS AND METHODS FOR CONTROLLING HEATING OF AN OBJECTIVE IN A LINESCANNING SEQUENCING SYSTEM TO IMPROVE RESOLUTION

RELATED APPLICATION SECTION

This application claims the benefit of and priority to U.S. Provisional Patent Application No. 63/277,992, filed Nov. 10, 2021, and U.S. Provisional Patent Application No. 63/282,555, filed on Nov. 23, 2021, the content of each which is incorporated by reference herein in their entireties and for all purposes.

BACKGROUND

A linescan sequencing system may use laser line illumination to detect and sequence a biological specimen. The laser line illumination may be substantially in the shape of a line or a substantially line-shaped illumination. High power laser line illumination enables high throughput scanning using a time delay integration (TDI) sensor to detect fluorescence emissions from a flow cell. An optical imager for use with such an optical sequencing system includes a beam shaping group having one or more optical elements configured and arranged to form a line-shaped illumination beam and an objective configured and arranged to focus the line-shaped illumination beam at a flow cell to cause fluorescence emissions from the flow cell.

SUMMARY

Advantages of the prior art can be overcome and benefits as described later in this disclosure can be achieved through the provision of apparatus and methods for controlling heating of an objective in a linescanning sequencing system to improve resolution. Various implementations of the apparatus and methods are described below, and the apparatus and methods, including and excluding the additional implementations enumerated below, in any combination (provided these combinations are not inconsistent), may overcome these shortcomings and achieve the benefits described herein.

In accordance with a first implementation, an apparatus includes or comprises a beam source, a beam shaping group, and an objective. The beam source for providing input radiation and the beam shaping group including or comprising one or more optical elements positioned to receive the input radiation from the beam source, and to perform beam shaping on the input radiation to form a shaped beam. The objective positioned to receive the shaped beam and to transform the shaped beam into a probe beam. The objective further configured to provide the probe beam to a focal plane of the objective for optically probing a sample. The beam shaping group is configured to adjust one or more properties of the shaped beam over time to generally uniformly heat the objective over a region of incidence for the shaped beam.

In accordance with a second implementation, an apparatus for controlling thermal lensing or absorption based heating on an objective includes or comprises: a beam source to provide input radiation; a beam shaping group having or comprising: one or more optical elements configured to receive the input radiation from the beam source and further configured to shape the input radiation into a substantially line-shaped beam being substantially uniform along a long axis of the substantially line-shaped beam, and wherein the substantially line-shaped beam has or comprises a short axis perpendicular to the long axis, and a modifier configured to widen the first beam in a direction along the short axis of the substantially line-shaped beam; and an objective configured and positioned to transform the shaped beam into a probe beam focused to a focal plane of the objective, wherein the objective is defocused such that the focal plane is further from the objective than a sample being optically probed, wherein the modifier is configured to widen the first beam to generally uniformly illuminate the objective.

In accordance with a third implementation, an apparatus including or comprising a beam source, a multi-mode fiber, and a beam shaping group. The beam source configured to provide input radiation. The multi-mode fiber configured to receive the input radiation from the beam source and to output radiation from an output of the multi-mode fiber, the output being at an output plane of the multimode fiber. The beam shaping group having or comprising one or more optical elements configured to (i) receive the output radiation from the multi-mode fiber, (ii) project an image of the output plane of the multi-mode fiber, and (iii) expand the image in one direction. The objective configured to receive the image from the beam shaping group, and further configured to project the image to a focal plane of the objective.

In accordance with a fourth implementation, a method of controlling heating of an objective includes or comprises: providing, by a beam source, input radiation to a beam shaping group, the beam shaping group including or comprising one or more optical elements; performing, by the beam shaping group, beam shaping of the input radiation and forming a shaped beam; and focusing, by an objective, the shaped beam to form a probe beam, the probe beam focused at a focal plane of the objective for optically probing a sample. The beam shaping group adjusts one or more properties of the shaped beam over time to generally uniformly heat the objective.

In accordance with a fifth implementation, a method of controlling heating of an objective includes or comprises: providing, by a beam source, input radiation to a beam shaping group, the beam shaping group including or comprising one or more optical elements; shaping, by the beam shaping group, the input radiation into a substantially line-shaped beam being substantially uniform along a long axis of the substantially line-shaped beam, and wherein the substantially line-shape beam has or comprises a short axis perpendicular to the long axis; widening, by a modifier in the beam shaping group, the substantially line-shaped beam in a direction along the short axis of the substantially line-shaped beam to form a shaped beam; and transforming, by an objective, the shaped beam into a probe beam, the probe beam being focused to a focal plane of the objective. The objective is defocused such that the focal plane is further from the objective than a sample being optically probed and the modifier is configured to widen the substantially line-shaped beam to generally uniformly illuminate the objective.

In further accordance with the first, second, third, fourth, and/or fifth implementations, an apparatus and/or method may further include or comprise any one or more of the following:

In an implementation, the one or more optical elements are configured to form the first shaped beam as a substantially line-shaped beam and the beam shaping group further includes or comprises a modifier configured to change a beam offset for the substantially line-shaped beam over time, such that, at different times, the substantially line-shaped beam is made to be incident on the objective at different respective locations of the objective.

In another implementation, the modifier is configured to change the beam offset over time such that the probe beam is a substantially unchanged line-shaped beam at or near the focal plane of the objective at different beam offsets In another implementation, the modifier is at least one of a selectively tiltable pane of material, a mirror, a wedge, or a prism.

In another implementation, the beam shaping group is further configured for the modifier to periodically cycle the beam offset through a plurality of beam offsets.

In another implementation, the modifier is configurable to move the substantially line-shaped beam back and forth across a transverse axis of the objective.

In another implementation, the modifier is configured to rotate the substantially line-shaped beam about an optical axis of the objective.

In another implementation, the beam offset may be in one or two directions.

In another implementation, the beam shaping group is configured to: perform beam shaping on the input radiation to form a substantially line-shaped beam as the shaped beam during a first time period; provide the substantially line-shaped beam to the objective during the first time period; perform beam shaping on the input radiation to form a broad beam as the shaped beam during a second different time period; and provide the broad beam to the objective during the second time period to pre-heat the objective.

In an implementation, the first time period corresponds to a time period of optical scanning of a sample, and the second time period corresponds to a time period when optical scanning of a sample is not being performed In an implementation, the beam source is at least one of a laser, a laser diode, a diode-pumped solid-state laser, or a coherent light source.

In an implementation, the one or more optical elements includes or comprises a Powell lens having or comprising a Powell axis, and the modifier expands the first beam along a non-Powell axis, the non-Powell axis being perpendicular to the Powell axis.

In another implementation, the modifier includes or comprises at least one of a cylindrical lens, a cylindrical telescope, an excitation cylindrical telescope, a defocus lens, a prism array, or a diffuser.

In another implementation, the beam source is at least one of a laser, a laser diode, a diode-pumped solid-state laser, or a coherent light source.

In an implementation, the one or more optical elements includes or comprises at least one of a cylindrical microlens array, or a diffractive optical element.

In another implementation, the beam source is at least one of a laser, a laser diode, a diode-pumped solid-state laser, or a coherent light source.

In according with an implementation, the shaped beam includes or comprises a substantially line-shaped beam, and wherein the method further includes or comprises: changing, by a modifier included or comprised in the beam shaping group, a beam offset of the substantially line-shaped beam over time, such that, at different times, the substantially line-shaped beam is incident on the objective at different respective locations of the objective.

In accordance with another implementation, the modifier is configured to change the beam offset over time such that the probe beam is a substantially unchanged line-shaped beam at or near the focal plane of the objective at different beam offsets.

In accordance with another implementation, the modifier includes or comprises at least one of a selectively tiltable pane of material, a mirror, a wedge, or a prism.

In accordance with another implementation, the method further includes or comprises changing, by the beam shaping group, the beam offset by periodically cycling by controlling the modifier to periodically cycle the beam offset through a plurality of beam offsets.

In accordance with another implementation, the modifier is configurable to move the substantially line-shaped beam back and forth across a transverse axis of the objective.

In accordance with another implementation, the modifier is configurable to rotate the substantially line-shaped beam about an optical axis of the objective.

In accordance with another implementation, the beam offset may be in one or two directions.

In accordance with another implementation, the method further includes or comprises: performing, by the beam shaping group, beam shaping on the input radiation to form a substantially line-shaped beam as the shaped beam during a first time period; providing the substantially line-shaped beam to the objective during the first time period; performing, by the beam shaping group, beam shaping on the input radiation to form a broad beam as the shaped beam during a second different time period; and providing the broad beam to the objective during the second time period to pre-heat the objective.

In accordance with another implementation, the first time period corresponds to a time period of optical scanning of a sample, and wherein the second time period corresponds to a time period when optical scanning of a sample is not being performed.

In accordance with another implementation, the beam source is at least one of a laser, a laser diode, a diode-pumped solid-state laser, or a coherent light source.

In accordance with another implementation, the one or more optical elements includes or comprises a Powell lens having or comprising a Powell axis, and widening the substantially line-shaped beam includes or comprises expanding, by the modifier, the substantially line-shaped beam along a non-Powell axis, the non-Powell axis being perpendicular to the Powell axis.

In accordance with another implementation, the modifier includes or comprises at least one of a cylindrical lens, a cylindrical telescope, an excitation cylindrical telescope, a defocus lens, a prism array, or a diffuser.

In accordance with another implementation, the beam source is at least one of a laser, a laser diode, a diode-pumped solid-state laser, or a coherent light source.

In accordance with a sixth implementation, a method for controlling heating of an objective includes or comprises: providing, by a beam source, input radiation to a multi-mode fiber; guiding, by the multi-mode fiber, the input radiation and outputting the inputting radiation from an output of the multimode fiber, the output being at an output plane; expanding, by a beam shaping group, an image of the output plane of the multi-mode fiber in one direction of the image; projecting, by the beam shaping group, the image of the output plane of the multi-mode fiber onto an objective; and projecting, by the objective, the image from the beam shaping group to a focal plane of the objective.

In accordance with an implementation, the one or more optical elements includes or comprises at least one of a cylindrical microlens array, or a diffractive optical element.

In accordance with another implementation, the beam source is at least one of a laser, a laser diode, a diode-pumped solid-state laser, or a coherent light source.

It should be appreciated that all combinations of the foregoing concepts and additional concepts discussed in greater detail below (provided such concepts are not mutually inconsistent) are contemplated as being part of the subject matter disclosed herein and/or may be combined to achieve the particular benefits of a particular aspect. In particular, all combinations of claimed subject matter appearing at the end of this disclosure are contemplated as being part of the subject matter disclosed herein.

BRIEF DESCRIPTION OF THE DRAWINGS

The accompanying figures, where like reference numerals refer to identical or functionally similar elements throughout the separate views, together with the detailed description below, are incorporated in and form part of the disclosure, and serve to further illustrate examples of concepts that include the claimed invention, and explain various principles and advantages of those examples. Moreover, the figures only show those specific details that are pertinent to understanding the examples of the disclosure so as not to obscure the disclosure with details that will be readily apparent to those of ordinary skill in the art having the benefit of the description herein.

Figure 1:
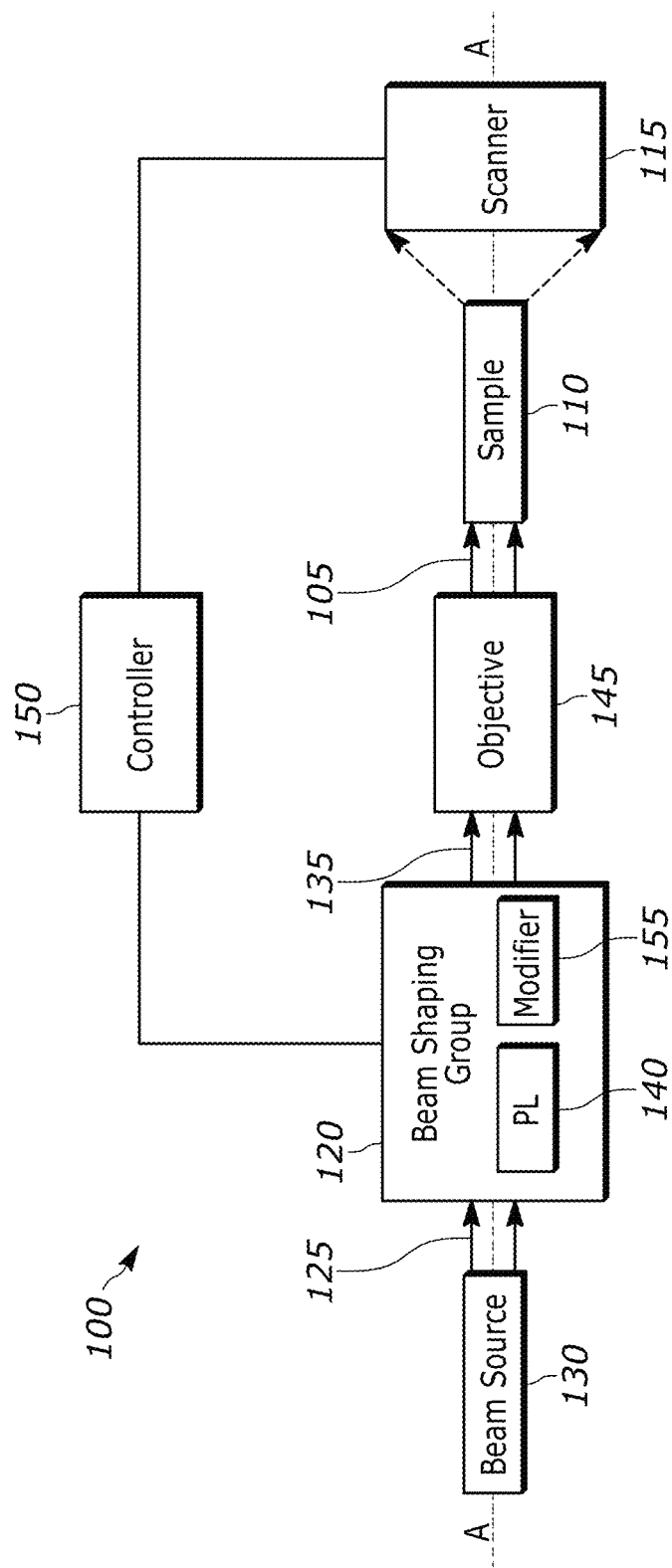
FIG. 1 illustrates a schematic diagram of an example optical imager apparatus in accordance with the teachings of this disclosure and having a beam shaping group configured to control heating of an objective.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Although the following description discloses a detailed description of implementations of methods, apparatuses and/or articles of manufacture, it should be understood that the legal scope of the property right is defined by the words of the claims set forth at the end of this patent. Accordingly, the following detailed description is to be construed as examples only and does not describe every possible implementation, as describing every possible implementation would be impractical, if not impossible. Numerous alternative implementations could be implemented, using either current technology or technology developed after the filing date of this patent. It is envisioned that such alternative implementations would still fall within the scope of the claims.

Use of a line-shaped illumination beam at a sample on a flow cell or another substrate in a linescan sequencing system typically entails passing a line-shaped beam through an objective of an optical imager of the sequencing system. When high power illumination is used, optical elements may absorb radiation causing absorption based heating and further may cause thermal lensing of the optical elements. For example, optical elements formed of materials with absorptions of 3%, 5%, 10%, or greater, absorb radiation during operation of the linescan sequencing system causing localized heating of the optical element which may result in astigmatic thermal lensing, anisotropic mechanical expansion, higher-order nonlinear optical contributions, or other distortions and undesirable effects. Additionally, the wavelength(s) of the illumination may further exacerbate localized heating of optical elements. Localized heating in a region of an optical element may cause a gradient in focusing power across optical elements such as the objective and cause uneven thermal expansions and refractive index changes resulting in astigmatism in the line-shaped beam, image quality degradations in linescan images, and/or any other degradations. The region of the optical element may include a center line of a lens, a center Gaussian region, etc. The optical degradations due to localized heating may not be easily correctable with further optical elements, in some instances. Additionally, adding further optical elements increases system costs, complexity of optical aligning and maintenance, and increases required space/real estate and weight of the system.

At least one aspect of this disclosure is directed toward an apparatus, in particular an optical imager, for use with a system that can be used to perform an analysis on one or more samples of interest. The sample may include one or more DNA clusters, such as a DNA cluster that has been linearized to form a single stranded DNA (sstDNA). In various examples, the apparatus is designed to reduce, manage, and/or control astigmatic thermal lensing of an objective of an optical imager apparatus of the system by generating a generally or substantially line-shaped illumination pattern at the sample in a manner that does not entail passing a substantially line-shaped beam through the objective or otherwise controls absorption based heating of the objective. By preventing and/or reducing non-uniform heating of an objective, the imaging resolution of a sequencing scanner that includes one of the example optical imager apparatuses disclosed herein can be increased.

A number of non-limiting example optical imager apparatuses are described below in connection with the figures. The beam transmitted through the objective may be changed over time using beam shifting, reshaping, or other methods to more uniformly heat the objective, in some examples. The beam passed through the objective may be broadened along a non-Powell axis such as along the smaller field angle axis or non-fanning axis of a Powell lens, thereby more uniformly illuminating the objective. The objective may then defocus the illumination beam to obtain a generally or substantially line-shaped illumination of the sample, in some examples. The beam may be broadened during pre-heating periods of time when the sample is not exposed to illumination and then narrowed to a line-shaped beam for illumination of a sample during sampling periods of time, in some examples. While examples are described herein as controlling heating of an objective, the present techniques may be used to control heating of other optical elements of an optical imager apparatus.

Reference will now be made in detail to non-limiting examples, some of which are illustrated in the accompanying drawings.

Controlling Heating Using Beam Decentering

Figure 12:
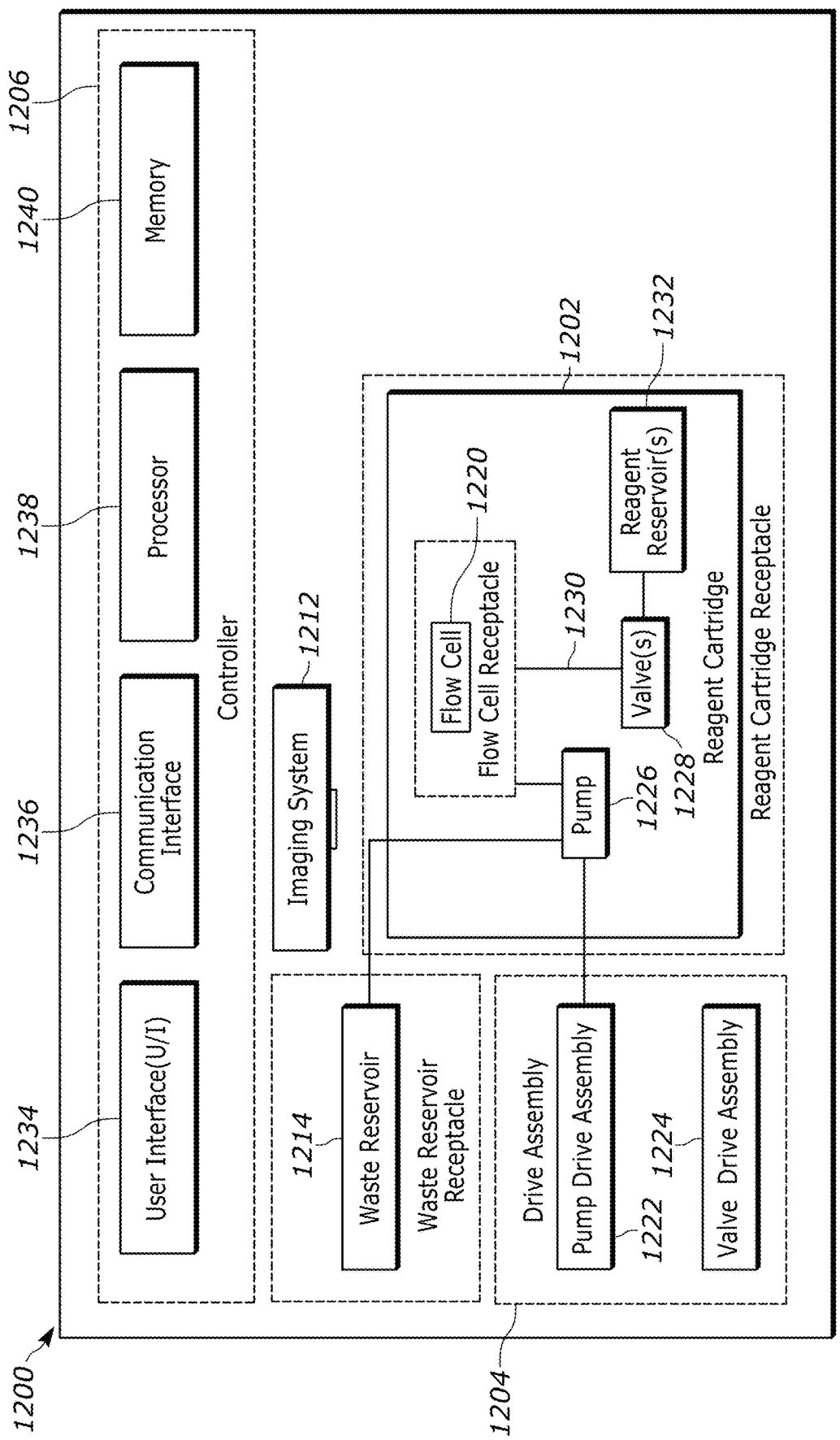
FIG. 12 illustrates a schematic diagram of an example implementation of a system in which teachings of this disclosure may be implemented.

FIG. 1 illustrates an example optical imager apparatus 100 in accordance with disclosed examples that may be part of a sequencing system such as a system 1200 of FIG. 12. The apparatus 100 is generally configured to form a generally or substantially line-shaped pattern of probe illumination 105 on a sample 110 on a flow cell or another substrate. As used herein, a "flow cell" can include a device having a lid extending over a reaction structure to form a flow channel therebetween that is in communication with a plurality of reaction sites of the reaction structure, and can include a detection device that detects designated reactions that occur at or proximate to the reaction sites. The shaped pattern of probe illumination 105 is a generally or substantially line-shaped pattern, in disclosed examples. Exposure to the probe illumination 105 causes the sample 110 to fluoresce and the emitted florescent illumination or radiation can be detected, sensed, and/or imaged by any number and/or types of scanners 115 having one or more detectors, sensors, or cameras.

The optical imager apparatus 100 includes an example beam shaping group 120 disposed along an optical axis A, with the shaping group 120 arranged and configured to receive an input beam 125 generated by a beam source 130. The input beam 125 may be referred to herein as input radiation. The beam shaping group 120 further alters the input beam to form a desired shaped beam 135 having a desired spatial profile. The beam source 130 may be implemented using any number and/or type(s) of lasers, laser diodes, diode-pumped solid-state lasers, coherent light sources, light emitting diodes, black body sources, optical amplifiers, filters, and/or amplifier stages. The beam source 130 may, however, be implemented in different ways.

The beam source 130 may emit light in the blue region of visible light, in some examples. In other examples, the beam source 139 may emit light in the ultraviolet spectrum or another spectrum for exciting fluorescence from a probed sample. Further, while described often herein as a beam, the light or beam may additionally be referred to herein as radiation or illumination, as a person of ordinary skill in the art would recognize. For example, it may be more convenient to discuss the light in terms of a beam when describing different spatial modes of the light, or as radiation when describing heat loads or absorption depending on the context of the discussion. While described herein as being a single beam and a single beam source 130, it should be understood that multiple beam sources may provide multiple beams individually, in a pulsed interleaved manner, or simultaneously to the elements of the systems and apparatus described herein.

A collimator (not shown for clarity of illustration) may be disposed along the optical axis A between the beam source 130 and the beam shaping group 120 to collimate the input beam 125 as needed or desired. One or more collimators, lenses, or telescopes may be used to manage the size of the beam as the beam propagates between beam shaping elements, between elements of the optical imager apparatus 100, or to focus the beam at a focal (far field) plane, for example.

The beam shaping group 120 includes any number and/or type(s) of optical components or elements, such as focusing surfaces, lenses, reflective surfaces, or mirrors, diffractive elements, filters, polarizers, waveplates, apertures, spatial light modulators, and microlens arrays. One or more of the optical components or elements of the beam shaping group 120 may be disposed along the optical axis A and configured to shape the input beam 125 to form, generate, etc. the desired shaped beam 135 at a far field having the sample 110, to allow for optical probing of the sample 110. The beam shaping group 120 may include a Powell lens 140, a beam shaping lens, and/or diffractive or scattering components. The substantially line-shaped beam profile 105 at the far field coincides with the profile of one or more line scanning sensors 115 allows for probing of the sample in flow cell applications.

An objective 145 is disposed along the optical axis A and the objective 145 focuses the shaped beam 135 such that the probe illumination 105 is propagated toward and focused on the sample 110. The objective 145 has an objective pupil (not shown for clarity of illustration) and the objective is disposed to receive the shaped beam 135 such that the objective pupil is not overfilled, in some examples. That is, the shaped beam 135 is not clipped by the objective pupil or any other apertures in association with the objective 145.

The objective 145 transforms the shaped beam 135 into the probe illumination 105, with the probe illumination 105 having a substantially line-shaped beam profile at a focal plane of the objective 145. The focal plane of the objective 105 may be at the sample 110 or a region of the sample 110, in a region along the optical axis A upstream of the sample 110, or in a region along the optical axis A downstream the sample 110 such as between the sample 110 and the scanner 115. The probe illumination 105 may further be referred to herein as a probe beam in certain contexts.

A controller 150 of the optical imager apparatus 100 or, more generally of a scanning system including the optical imager apparatus 100, is used to control and/or configure the beam shaping group 120 to perform the beam shaping and manage and/or control heating of the objective 145.

The beam shaping group 120 includes one or more example modifiers (one of which is designated at reference numeral 155) that can be controlled and/or positioned to modify one or more characteristics of the shaped beam 135 to control, manage, uniformize, and/or distribute the shaped beam 135 and heating the objective 145. The modifier 155 may be located at any number of locations in the beam shaping group 120 but, in some implementations, is disposed along the optical axis A follow downstream of the Powell lens 140. The modifier 155 may modify the shaped beam 135 while the optical imager apparatus 100 is being operated for linescan imaging and, in some implementations, the modifier 155 may modify the shaped beam 135 in between linescan images being captured. The modifier 155 may modify the shaped beam 135 during periods of time when the scanner 115 is not capturing or imaging fluorescence from the sample 110, for example.

The modifier 155 selectively changes the pattern of the shaped beam 135 over time such as by beam offsetting, while maintaining a consistent, substantially line-shaped pattern of probe illumination 105 at the sample 110 and/or at a focal plane of the objective 145. The shaped beam 135 is substantially line-shaped, in some examples, and the modifier 155 decenters the shaped beam 135 by different amounts and/or directions over time such that the shaped beam 135 is incident at different locations on the objective 145. The pattern of probe illumination 105 at the sample 110 will retain its desired line-shaped pattern and size and continue to fall incident at the same place on the sample 110 because the modifier 155 decenters the shaped beam 135 without modifying the angle at which the shaped beam 135 falls incident on the objective 145. The shaped beam 135 may be offset in one or both directions on the objective 145 such as along the horizontal and vertical axes.

The modifier 155 can be selectively positioned, tilted, and/or controlled by the controller 150 and/or an associated instrument to sweep the shaped beam 135 back and forth across the objective 145 or to cycle the beam offset through a plurality of beam offsets in a set pattern or order, in some examples. The modifier 155 may include one or more of a selectively tiltable pane of material, a mirror, a one-dimensional wedge, a prism, a dispersive element, a polarizer, and/or a waveplate. The modifier 155 may include a tillable transparent plate that provides the beam displacement in a horizontal and/or vertical direction through optical refraction. The controller 150 and/or an associated instrument may cause the modifier 155 to rotate to orbit the line-shaped beam 135 about a central axis or optical axis of the objective 145 (i.e., a Z-axis), such as around the optical axis A of FIG. 1, in examples. The modifier 155 may include two prisms configured as a Risley prism pair for translating the shaped beam 135 around the objective 145. One or more of the prisms of the Risley prism pair may be rotated or translated to provide a beam offset in a horizontal or vertical direction, or may rotate the position of the shaped beam 135 around the objective 145.

Figure 2:
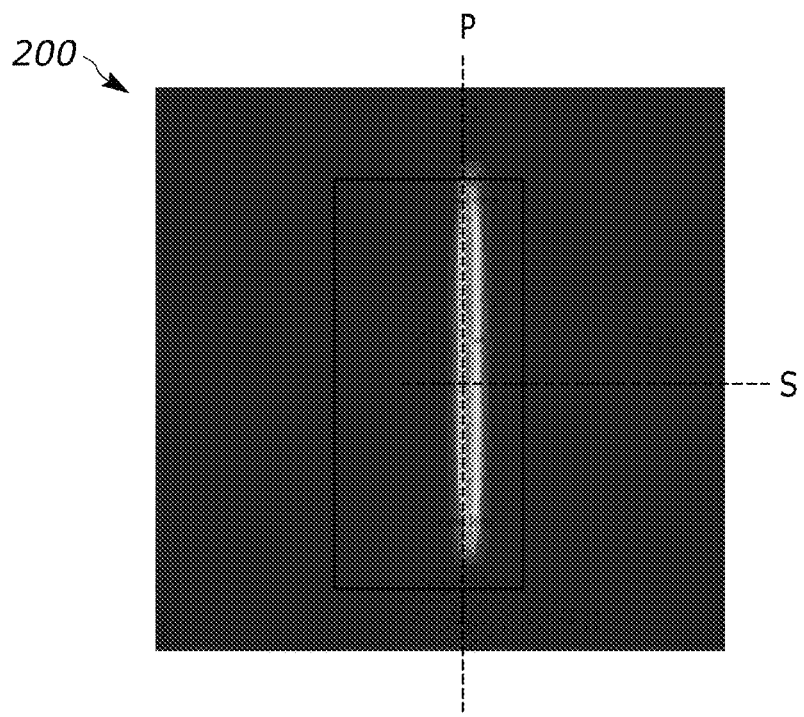
FIG. 2 shows an example pattern of illumination of a sample resulting from the optical imager apparatus of FIG. 1 in accordance with teachings of this disclosure.

FIG. 2 shows an example pattern of illumination 200 that may be provided as the probe illumination 105 provided to the sample 110 by the optical imager apparatus 100 as the modifier 155 decenters the beam 135 over time. The pattern of illumination 200 is a substantially line-shaped pattern of illumination 200 having a long axis P which may be along the Powell axis of a Powel lens, in examples regardless of any decentering of the beam 135 by the modifier 155. The substantially line-shaped pattern further has a short axis S that is perpendicular to the long axis P. The substantially line-shaped pattern of illumination 200 as illustrated in FIG. 2 has a peak intensity that spans along the long axis P, resulting in substantially uniform intensity along the long axis, while the intensity quickly decreases along the short axis S.

Figure 3:
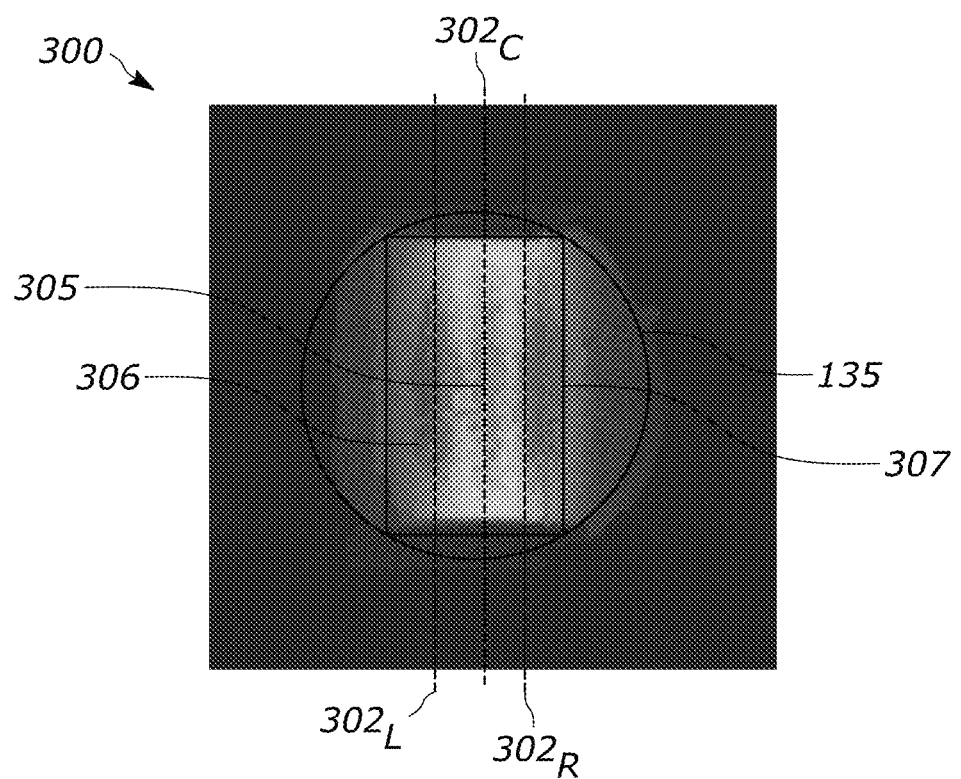
FIG. 3 shows an example pattern of illumination of an objective over time resulting from the optical imager apparatus of FIG. 1 in accordance with teachings of this disclosure.

FIG. 3 shows an example pattern of illumination 300 of the objective 145 integrated over time with the shaped beam 135 provided to the objective 145 at three different positions on the objective 145. The objective 145 may have a circular aperture or lens and, thus, for simplicity and clarity, the objective 145 is represented in FIG. 3 by a circle. The modifier 155 provided the substantially linearly shaped beam 135 to the objective at a central position $302_C$, and two decentered positions, a left position $302_L$, and a right position $302_R$. The example illumination 300 includes three different line-shaped patterns 305, 306 and 307 corresponding to the beam 135 being centered at a first time at the central position $302_C$, decentered in a first direction to the right position $302_R$ at a second time, and decentered in a second direction to the left position $302_L$ at a third time, respectively. The resulting illumination 300 is substantially more uniform as shown than would result by providing the shaped beam 135 to the objective 145 at a single position (e.g., as shown in FIG. 2). The illumination pattern 300 may result in significantly more uniform illumination and, thus, more uniform heating of the objective 145, especially when the objective 145 heats slowly (e.g., over seconds) due to absorption of illumination. While illustrated as moving along the short axis S of the illumination 300, the modifier may shift the beam offset in a vertical direction along the long axis P, or along a diagonal direction, or another direction for providing radiation to different parts of the objective 145 at different times.

Controlling Heating Using Non-Powell Axis Beam Widening According to an Example

Figure 4:
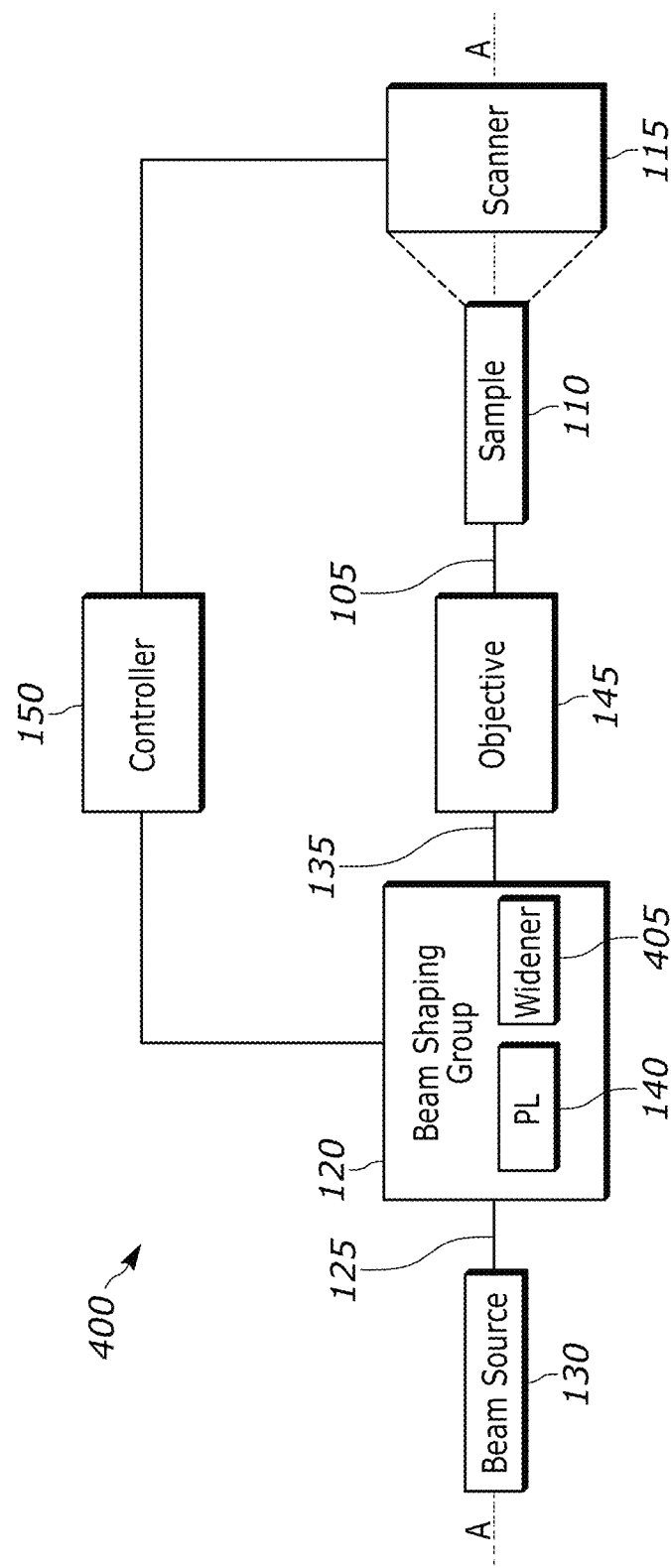
FIG. 4 illustrates a schematic diagram of another example optical imager apparatus in accordance with the teachings of this disclosure and having a beam shaping group configured to control heating of an objective.

FIG. 4 illustrates another example optical imager apparatus 400 in accordance with disclosed examples that may be part of a sequencing system such as the system 1200 of FIG. 12. The apparatus 400 is generally configured to provide a substantially line-shaped pattern of probe illumination 105 to a sample 110 on a flow cell, for example. The shaped pattern of the probe illumination 105 is a substantially line-shaped pattern, in disclosed examples. The probe illumination 105 is exposed to the sample 110 and causes the sample 110 to fluoresce and the scanner(s) 115 detects, senses, and/or images radiative emissions from the sample 110.

Elements of FIG. 4 that are substantially identical and/or functionally similar to elements of FIG. 1 are designated with identical reference numerals in FIGS. 1 and 4. The description of these elements will not be repeated here for the sake of a compact disclosure. The interested reader is instead referred to the description of these elements provided above in connection with FIG. 1. The radiation and beams may additionally be provided between elements of FIGS. 1 and 4 through free-space, optical fibers, another waveguide, or by another means capable of transmitting optical radiation.

The beam shaping group 120 of FIG. 4 includes one or more example wideners (one of which is designated at reference numeral 405) that can be configured, adapted, controlled, and/or positioned to modify one or more characteristics of the shaped beam 135 to control, manage, and/or uniformize illumination of and, thus, heating of the objective 145. The widener 405 may be located at any number of locations in the beam shaping group 120 but, in some implementations, the widener 405 is disposed along the optical axis A downstream of the Powell lens 140.

Figure 5:
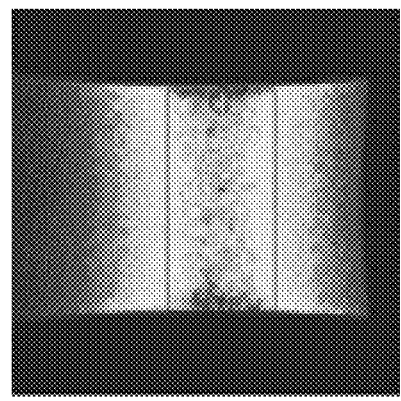
FIG. 5 shows an example pattern of illumination of an objective resulting from the optical imager apparatus of FIG. 4 in accordance with teachings of this disclosure.

The widener 405 widens the shaped beam 135 along the non-Powell axis such as the short axis S of FIG. 2. The widening of the beam 135 increases the area of the illumination field, thereby reducing the overall illuminance such as lumens per area and fluence such as energy per area provided to the objective 145. Widening of the beam 135 increases the footprint of the illumination by the beam 135 on the objective 145 and causes a more uniform irradiation and/or heating of the objective 145. A more correctable optical aberration may be achieved as a result that is more uniform or spherical, less intense, more gradual in gradient or differential. An example resultant illumination pattern 500 is shown in FIG. 5. Example wideners 405 include a cylindrical lens, a cylindrical telescope, an excitation cylindrical telescope, a defocus lens, a prism array, a diffuser, a birefringent element, a spatial light modulator, a microlens array, and/or a diffractive element positioned and configured to widen the shaped beam 135 along its non-Powell axis such as a non-substantially linear axis. An excitation cylindrical telescope is used, in some examples, to control the beam waist in the non-Powell axis. This method allows control of the peak beam intensity at both imaging and non-imaging points within the Z-space of the objective 145 such as along optical axis A in the direction of propagation shown in FIG. 1. This method can moreover be used to control the incident footprint of the shaped beam 135 at points internal to the objective 145. As used herein, the term "footprint" is used to refer to the various radiation field, or illumination shape angles such as horizontal and vertical angles of a substantially linear or rectangular field, circular radius of a field, or geometric parameters and values associated with Gaussian or other shaped beams or fields. Further, the footprint is also indicative of energy distribution of the field, and therefore, radiative absorption and heat distribution of the objective 145.

Figure 6A:
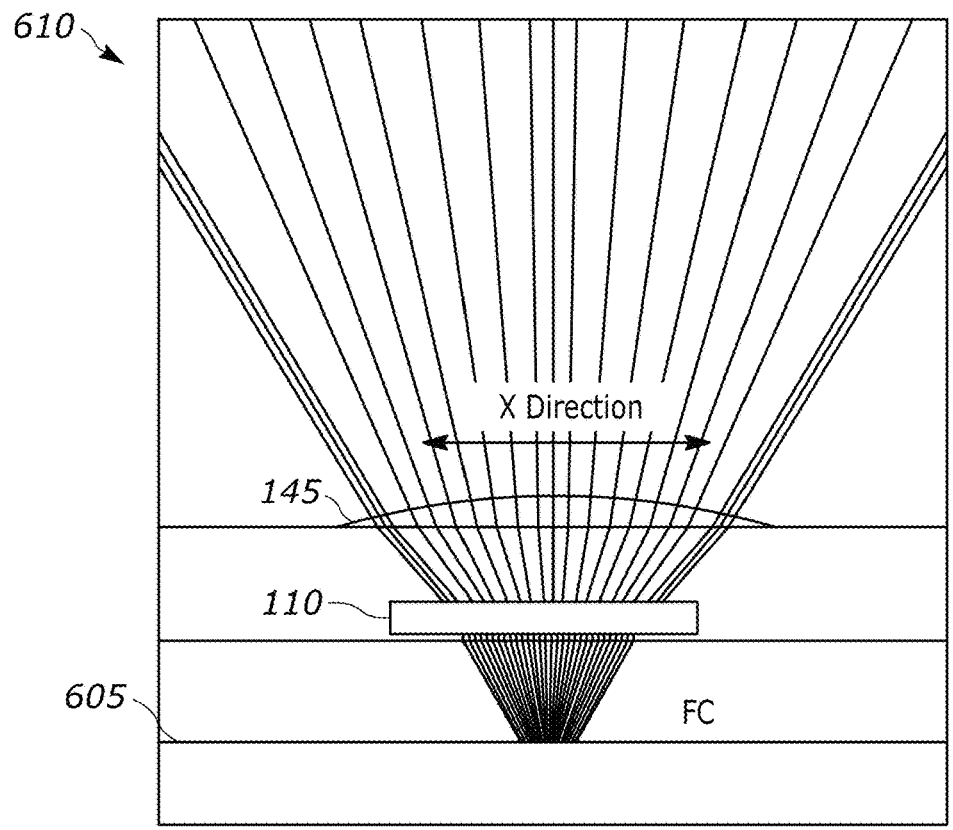
FIG. 6A illustrates an example illumination pattern in the X-axis resulting from the optical imager apparatus of FIG. 4 in accordance with teachings of this disclosure.
Figure 6B:
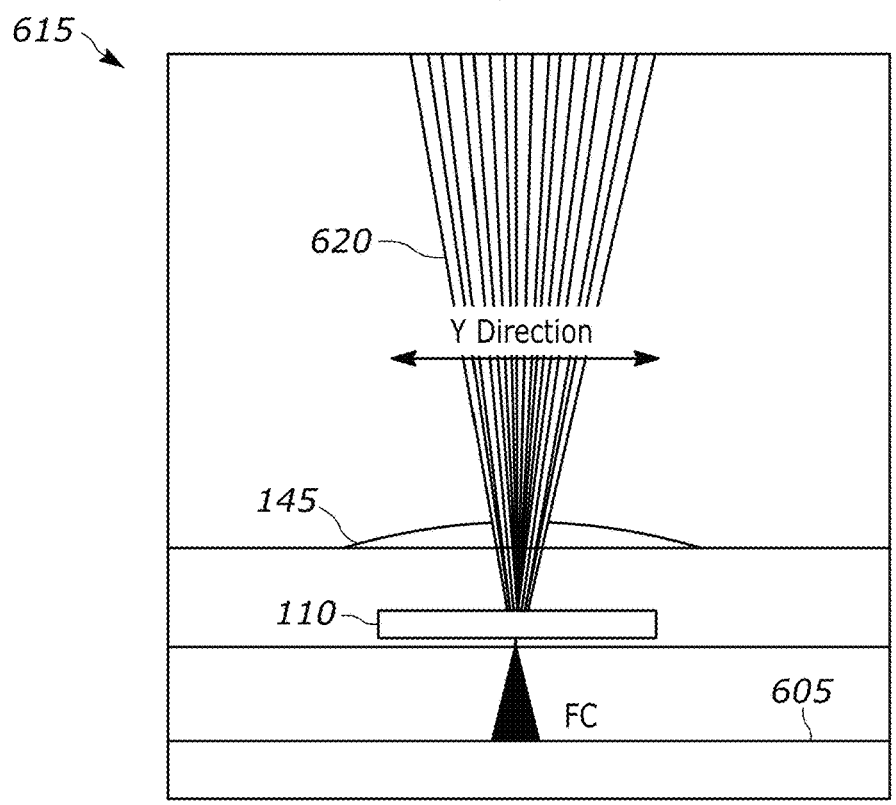
FIG. 6B shows an example illumination pattern in the Y-axis resulting from the optical imager apparatus of FIG. 4 in accordance with teachings of this disclosure.

The widening of the pattern of the shaped beam 135 by the widener 405 increases the width of the line-shaped pattern of the probe illumination 105 incident on the sample 110 along the non-scan axis, parallel to the non-Powell axis). The objective 145 can be defocused to compensate for the increase in the width of the probe illumination 105 by moving the objective 145 along the Z-axis to focus the pattern 105 on a focal plane 605 beyond the surfaces of the sample 110, as illustrated in FIGS. 6A and 6B. The Z-axis of the objective 145 is along the propagation axis of the shaped beam 135, which, in examples, is along the optical axis A of FIGS. 1 and 4. FIG. 6A shows an example illumination pattern 610 in the X-axis, being the substantially linear or Powell axis, when the objective 145 is de-focused. FIG. 6B shows an example illumination pattern 615 in the Y-axis, being the non-Powell axis, when the objective 145 is defocused. The objective 145 may be defocused such that rays 620 in the Y-axis crossover at the sample 110, as shown in FIG. 6B. FIGS. 6A and 6B illustrate that defocusing the objective 145 results in a substantially line-shaped pattern of illumination on the sample 110 while having the widened beam 135 incident on the objective 145 (e.g., as shown in FIGS. 5 and 6B).

Figure 7:
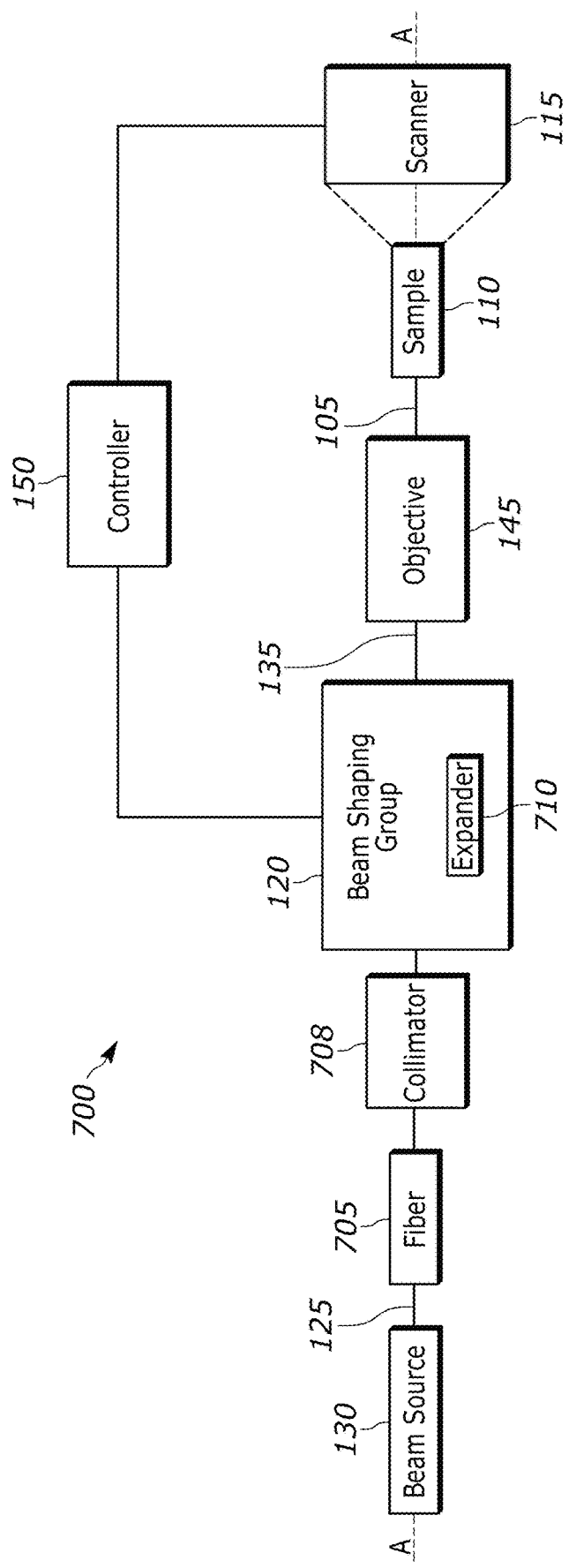
FIG. 7 illustrates a schematic diagram of yet another example optical imager apparatus in accordance with the teachings of this disclosure and having a beam shaping group configured to control heating of an objective.

Controlling Heating Using Non-Powell Axis Beam Widening According to Another Example FIG. 7 illustrates yet another example optical imager apparatus 700 in accordance with disclosed examples that may be part of a sequencing system such as the system 1200 of FIG. 12. The apparatus 700 is generally configured to form a generally line-shaped pattern of probe illumination 105 on a sample 110 on a flow cell or other substrate. The shaped pattern of probe illumination 105 is a generally line-shaped pattern, in disclosed examples. Fluorescent emissions by the sample 110 caused by the shaped pattern of probe illumination 105 can be detected, sensed, and/or imaged by the scanner(s) 115.

Elements of FIG. 7 that are substantially identical and/or functionally similar to elements of FIG. 1 are designated with identical reference numerals in FIGS. 1 and 7. The description of these elements will not be repeated here for the sake of a compact disclosure. The interested reader is instead referred to the description of these elements provided above in connection with FIG. 1.

The beam shaping group 120 of FIG. 7 includes a multi-mode fiber 705, a collimator 708, and an expander 710 that can be configured, adapted, controlled, and/or positioned to modify one or more characteristics of the shaped beam 135 to more spatially broadly or uniformly provide the shaped beam 135 to the objective 145 resulting in a more uniform heating of the objective 145. A more correctable optical aberration may be achieved as a result that is more spherical, less relative deviation, and/or more uniform. The multi-mode fiber 705 may instead be a light pipe, multimode waveguide, or another radiation guiding material and/or structure.

The input beam 125 is input to the fiber 705 and the collimator 708 is disposed to receive the light from an output of the multi-mode fiber 705 and to collimate and provide the light to the bream shaping group 120. The collimator 708 may be a rotationally symmetric collimator, or, in examples, the collimator 708 may be an anamorphic collimator that collimates a beam differently along different dimensions.

An anamorphic collimator may be used in any of the example systems described herein to further form a substantially line-shaped pattern, or for performing other beam shaping for controlling heating of the objective 145. The beam shaping group 120 and the objective 145 are disposed at a position and configured to project a de-magnified image of an output end of the fiber 705 onto the sample 110 and positioned at an output plane. The multi-mode fiber 705 allows multiple spatial modes of propagation for radiation being guided in the fiber. Typical multi-mode fibers therefore provide larger overall optical fields with wider field angles as compared to single-mode fibers. The multi-mode fibers further allow broader bands of wavelengths to be guided through the fiber. Example expanders 710 include a cylindrical microlens array, a diffractive optical element, a telescope, and cylindrical telescope. The expander 710 is configured and positioned to widen the width of the beam 135 in the non-scan axis such as the non-Powell axis, and the objective 145 then projects the image onto the sample 110. The beam source 130 may be selected to provide a wider input beam 125 to prevent or control asymmetry of the input beam 125 and, thus, asymmetry of the shaped beam 135.

Figure 8A:
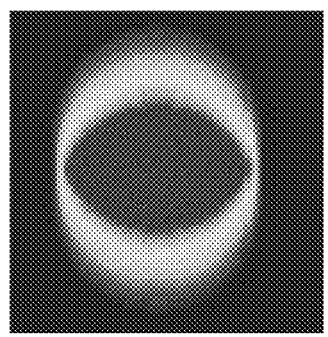
FIG. 8A shows an example pattern of illumination of the objective resulting from the optical imager apparatus of FIG. 7 using the multi-mode fiber, the expander, and rotationally symmetric collimator as the collimator.

FIG. 8A shows an example pattern of illumination 800 of the objective 145 resulting from the optical imager apparatus 700 of FIG. 7 using the multi-mode fiber 705, the expander 710, and rotationally symmetric collimator as the collimator 708. The example illustrated in FIG. 8A used a laser diode as the beam source 130, a 200×200 µm multi-mode fiber as the fiber 705, the beam shaping group 120 expanded the beam along the scan-axis, and a cylindrical microlens array as the expander 710 that expanded the beam along the non-scan axis to form the shaped beam 135. The resultant pattern of illumination 800 is generally elongated along one axis such as, the vertical axis shown, to provide a wider footprint of illumination at the objective 135, while preserving a focused tighter probe illumination 105 at, or near, the sample 110.

Figure 8B:
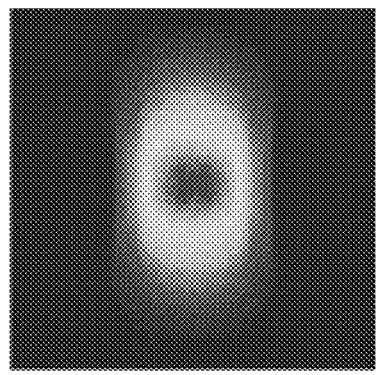
FIG. 8B shows an example pattern of illumination of the objective resulting from the optical imager apparatus of FIG. 7 using the multi-mode fiber, the expander, and rotationally symmetric collimator as the collimator.
Figure 8C:
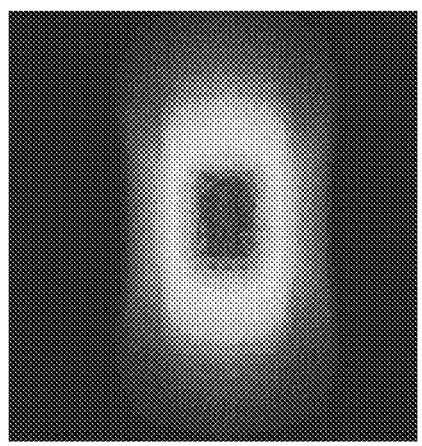
FIG. 8C shows another example pattern of illumination of the objective resulting from the optical imager apparatus of FIG. 7 using the multi-mode fiber, the expander, and rotationally symmetric collimator as the collimator.

FIGS. 8B and 8C show example patterns of illumination 820 and 840 of the objective 145 resulting from the optical imager apparatus 700 of FIG. 7 using the multi-mode fiber 705, the expander 710, and rotationally symmetric collimator as the collimator 708. The examples illustrated in FIGS. 8B and 8C used a laser diode as the beam source 130, a 100×100 µm multi-mode fiber as the fiber 705, the beam shaping group 120 expanded the beam along the scan-axis, and a cylindrical microlens array was used as the expander 710 that expanded the beam along the non-scan axis to form the shaped beam 135. The illumination 820 of FIG. 8B is incident on the objective 145 with a spacing distance of 50 mm between the beam shaping group 120 and the objective 145. The illumination 820 of FIG. 8B exhibits no clipping of the illumination 820 by any of the optical elements of the beam shaping group 120. The illumination 840 of FIG. 8C is incident on the objective with a spacing distance of about 75 mm between the beam shaping group 120 and the objective 145. The rectangular features, such as less curved beam profile edges, of the illumination 840 are indicative of clipping, which, for the example of FIG. are due to pupil overfill of the objective 145. Therefore, the respective illuminations 820 and 840 of FIGS. 8B and 8C provide substantially even illumination to the objective allowing for more even distributions of heating of the objective with and without clipping of the beam.

Figure 8D:
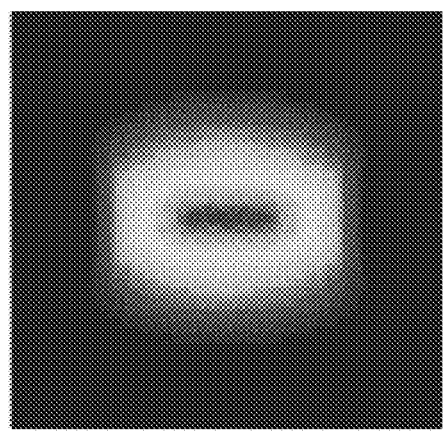
FIG. 8D shows an example pattern of illumination at the objective resulting from the optical imager apparatus of FIG. 7 using the multi-mode fiber, the expander, and an anamorphic collimator as the collimator.

FIG. 8D shows an example pattern of illumination 860 at the objective 145 resulting from the optical imager apparatus 700 of FIG. 7 using the multi-mode fiber 705, the expander 710, and an anamorphic collimator as the collimator 708. The anamorphic collimator collimates the beam to have a smaller beam profile in the vertical direction (as illustrated) and a wider collimated beam profile in the horizontal direction to shrink the image of the output of the fiber 705 to a 48 µm field of view at the sample, which, in the present example, is a desired field of view for an illumination footprint at the sample 110. The example illustrated in FIG. 8D used a laser diode as the beam source 130, a 150×150 µm multi-mode fiber as the fiber 705, the beam shaping group 120 expanded the beam along the scan-axis, and a cylindrical microlens array as the expander 710 that expanded the beam along the non-scan axis to form the shaped beam 135. The shorter focal length of the collimator 708 in the vertical direction resulted in a smaller overall beam than in the examples of FIGS. 8B and 8C. The resultant pattern of illumination 860 is generally elongated along one axis, to provide a wider footprint of illumination at the objective 135, while preserving a focused tighter probe illumination 105 at, or near, the sample 110. Specifically, the anamorphic collimator allows for a smaller beam in the vertical direction while maintaining the focal length in the horizontal direction which is beneficial to shrink an image of the output of the multi-mode fiber 705 into a smaller illumination footprint field of view, such as shrinking an image of the 150 mm multi-mode fiber into a 48 µm field of view.

Controlling Heating with Pre-Heating

Figure 9:
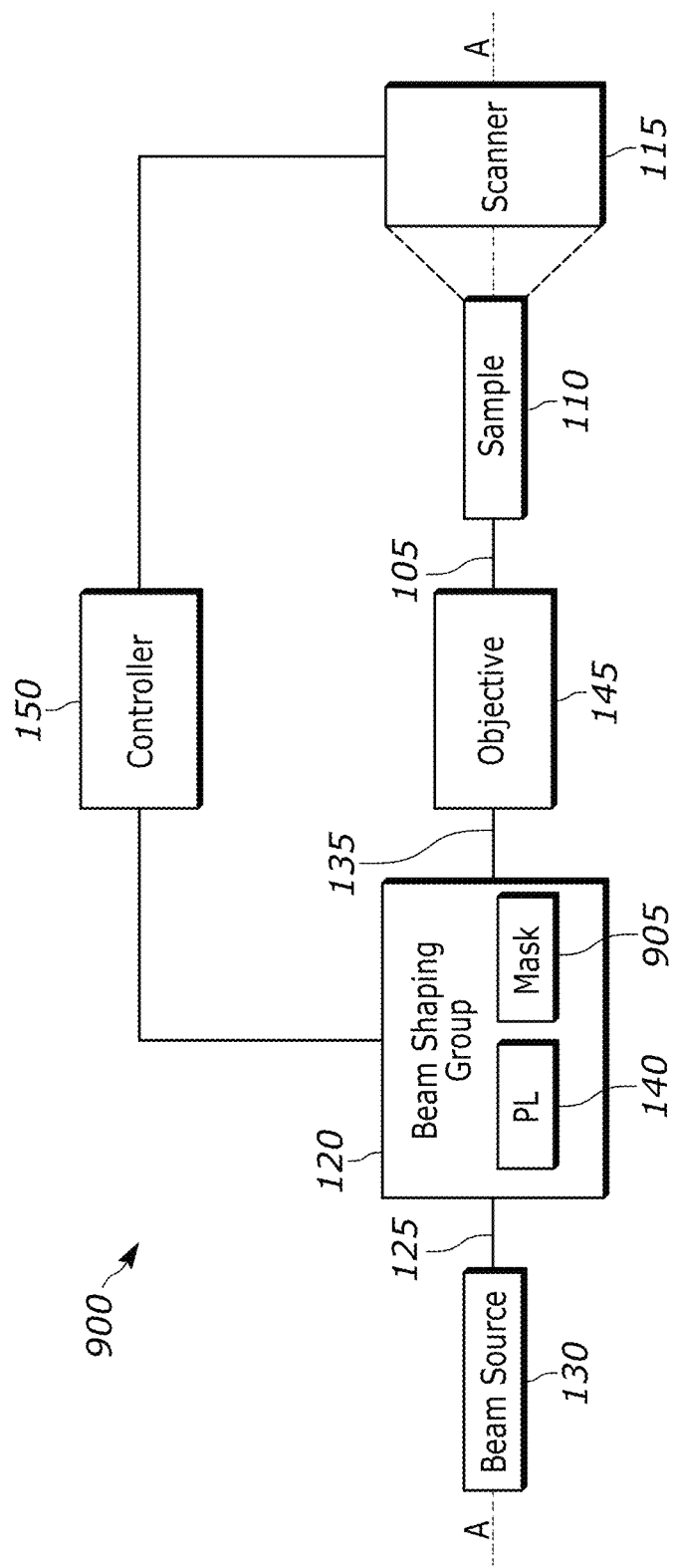
FIG. 9 illustrates a schematic diagram of still another example optical imager apparatus in accordance with the teachings of this disclosure and having a beam shaping group configured to control heating of an objective.

FIG. 9 illustrates yet another example optical imager apparatus 900 in accordance with disclosed examples that may be part of a sequencing system such as the system 1200 of FIG. 12. The apparatus 900 is generally configured to form a substantially line-shaped pattern of probe illumination 105 on a sample 110 on a flow cell and/or another substrate. The shaped pattern of probe illumination 105 is a substantially line-shaped pattern, in disclosed examples. The scanner(s) 115 can detect, sense, and/or image fluorescent emissions by the sample 110 caused by the shaped pattern of probe illumination 105.

Elements of FIG. 9 that are substantially identical and/or functionally similar to elements of FIG. 1 are designated with identical reference numerals in FIGS. 1 and 9. The description of these elements will not repeated here for the sake of a compact disclosure. The interested reader is instead referred to the description of these elements provided above in connection with FIG. 1.

The controller 150 and/or an associated instrument configures, adapts, controls, and/or positions the beam shaping group 120, and elements therein to modify one or more characteristics of the shaped beam 135 to preheat the objective 145. The beam shaping group 120 can be configured to selectively output a substantially line-shaped pattern as the shaped beam 135 or a broad pattern as the shaped beam 135 at different times. An example broad pattern is generally circular or rectangular, and sized to illuminate a large portion of the pupil of the objective 145. The broad pattern may thus be used to generally and uniformly illuminate all of the objective 145, or a substantial portion of the objective and cause a more uniform heating of the objective 145. A more correctable optical aberration may be achieved as a result that is more spherical, more uniform, less intense, etc. As described above, the substantially line-shaped pattern 135 can be used when linescanning the sample 110.

The broad pattern probe illumination 135 may be output and/or generated by, for example, controlling the beam shaping group 120 to bypass, remove from an optical path, and/or alter a configuration of one or more beam shaping optical elements such as the Powell lens 140. The broad pattern probe illumination may further be generated by bypassing, remove from the optical path, or otherwise manipulating any of the examples described above for widening a line-shaped pattern. A mask 905 such as an optical path flip in may be used when the broad pattern 135 is generated to block a central portion of the broad pattern 135 generally corresponding to the line-shaped pattern. The mask 905 may further be applied by a spatial light modulator or other tunable mask or filter element.

Figure 10:
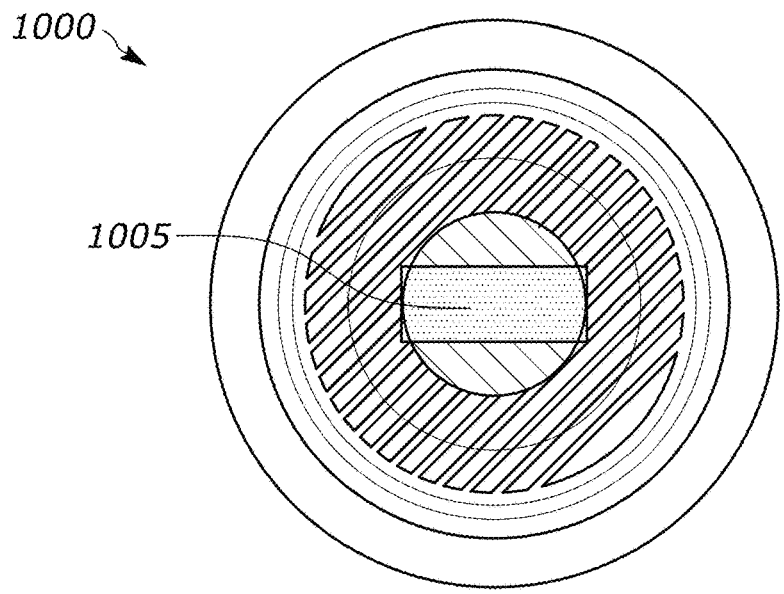
FIG. 10 illustrates an example mask for the optical imager apparatus of FIG. 9.

FIG. 10 illustrates an example mask 1000 that includes a solid central portion 1005 that blocks radiation from the central region of the mask 1000. The central portion 1005 corresponds spatially to a central portion of the objective 145, with the central portion 1005 of the mask 1000 configured to block radiation from reaching the central portion of the objective 145 while the mask is active. Selective broadening of the shaped radiation 135 combined with selective blocking of the central portion of the broadened shaped radiation 135 allows for providing radiation to, and heating of, the objective 145 to achieve more uniform heat distribution during operation of the optical imager apparatus 900. Alternating between generation of the broad pattern and the substantially line-shaped pattern can further result in a generally, on average, uniform illumination of the objective 145 and, thus, a generally uniform heating of the objective 145. The broad pattern can be used to preheat the outer portion of the objective 145 prior to imaging the sample 110, with the inner portion of the objective 145 being subsequently heated by the line-shaped pattern while linescanning samples 110.

Method of Controlling Heating

Figure 11:
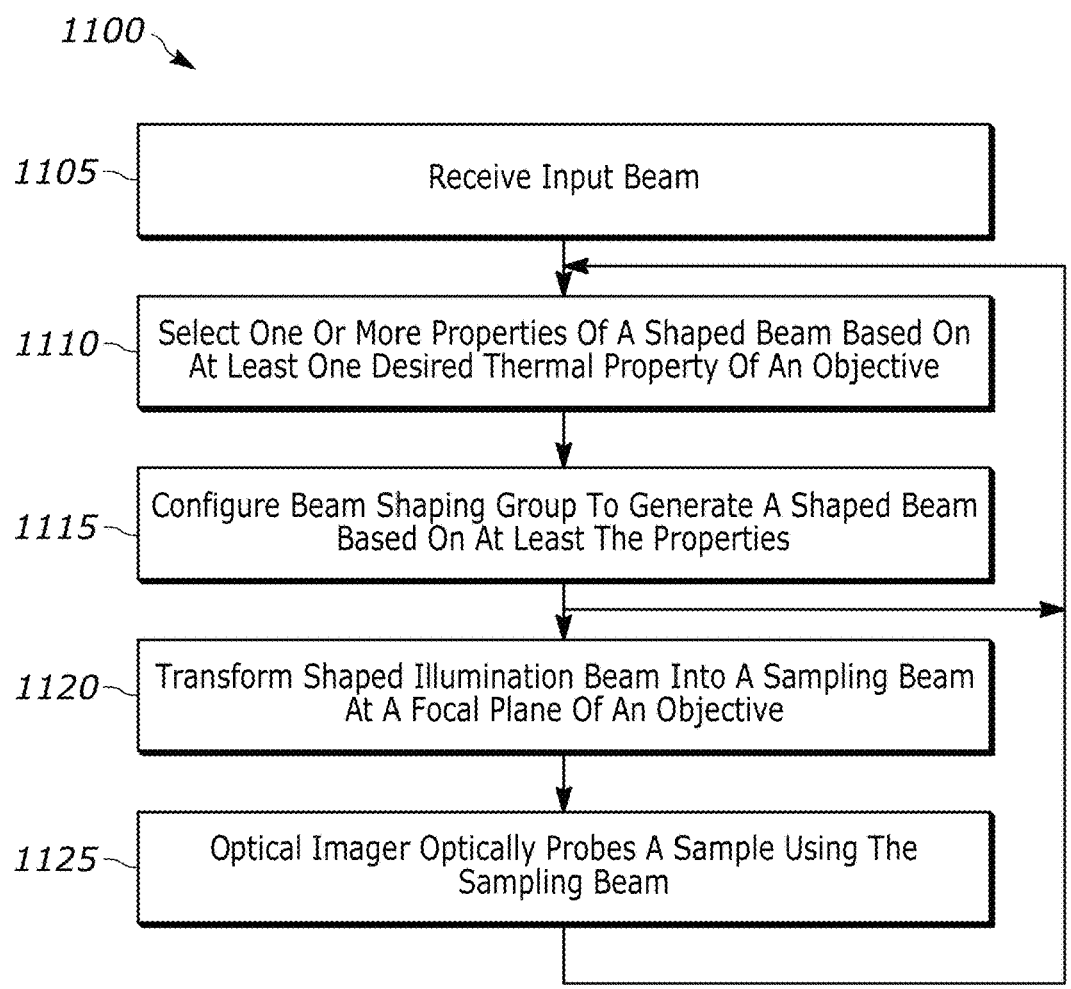
FIG. 11 is a flowchart representative of example processes that may be performed to implement operations of the examples disclosed herein.

FIG. 11 is a flowchart of an example process 1100 that may be implemented by an apparatus, in particular an optical imager apparatus such as the example optical imager apparatuses 100, 400, 700 and 900, to analyze one or more samples of interest. The sample may include one or more DNA clusters, such as a DNA cluster that has been linearized to form a single stranded DNA (sstDNA).

An apparatus receives an input beam (e.g., the example input beam 125) (block 1105). One or more properties of a shaped beam (e.g., the shaped beam 135) for a first time period are selected (block 1110). Example properties include, for the example optical imager apparatus 100, a beam decentering offset amount. Example properties include, for the optical imager apparatus 900, whether a line-shaped beam or a broad beam is to be generated. A beam shaping group (e.g., the beam shaping group 120) is configured to generate, form, and/or output the shaped beam based on at least the selected properties (block 1115).

The shaped beam is transformed into a substantially line-shaped sampling beam (e.g., the example probe illumination 105) at a focal plane (e.g., at a sample 110) of an objective (e.g., the objective 145) at block 1120. The apparatus optically probes a sample, using the substantially line-shaped sampling beam (block 1125).

The blocks 1110 and 1115 may be repeated to configure the generation of different shaped beams (e.g., with different beam offsets). Thus, blocks 1110 and 1115 may be periodically and/or aperiodically repeated to move a line-shaped patterned probe illumination 135 about the objective 145 to more uniformly illuminate and, thus, more uniformly heat the objective 145. The beam offset may be changed, and/or varied on a slow periodic basis such as every second or two or may be varied a higher frequency dither of beam position. The beam offset may be varied in one or two directions, or in various directions along multiple axes.

The blocks 1110 and 1115 may be carried out at a first time to generate a broad beam 135 that is generated until a second time when a linescan is to be performed. Before the linescan, blocks 1110 and 1115 may then be repeated to configure generation of a line-shaped beam 135 before block 1120 is started.

Example System

FIG. 12 illustrates a schematic diagram of an implementation of a system 1200 in accordance with the teachings of this disclosure. The system 1200 can be used to perform an analysis on one or more samples of interest. The sample may include one or more DNA clusters that have been linearized to form a single stranded DNA (sstDNA). In the implementation shown, the system 1200 receives a reagent cartridge 1202 and includes, in part, a drive assembly 1204 and a controller 1206. The system 1200 also includes, an imaging system 1212, and a waste reservoir 1214. In other implementations, the waste reservoir 1214 may be included with the reagent cartridge 1202. The imaging system 1212 include any one or more of the optical imager apparatus' 100, 400, 700, 900 of FIGS. 1, 4, 7, and 9 disclosed herein. The controller 1206 is electrically and/or communicatively coupled to the drive assembly 1204, and the imaging system 1212 and causes the drive assembly 1204, and/or the imaging system 1212 to perform various functions as disclosed herein.

The reagent cartridge 1202 carries the sample of interest that can be loaded into channels of a flow cell 1220. The drive assembly 1204 interfaces with the reagent cartridge 1202 to flow one or more reagents (e.g., A, T, G, C nucleotides) through flow cell 1220 that interact with the sample.

In an implementation, a reversible terminator is attached to the reagent to allow a single nucleotide to be incorporated onto a growing DNA strand. In some such implementations, one or more of the nucleotides has a unique fluorescent label that emits a color when excited. The color (or absence thereof) is used to detect the corresponding nucleotide. In the implementation shown, the imaging system 1212 excites one or more of the identifiable labels (e.g., a fluorescent label) and thereafter obtains image data for the identifiable labels. The labels may be excited by incident light and/or a laser and the image data may include one or more colors emitted by the respective labels in response to the excitation. The image data (e.g., detection data) may be analyzed by the system 1200. The imaging system 1212 may be a fluorescence spectrophotometer including an objective lens and/or a solid-state imaging device. The solid-state imaging device may include a charge coupled device (CCD) and/or a complementary metal oxide semiconductor (CMOS).

After the image data is obtained, the drive assembly 1204 interfaces with the reagent cartridge 1202 to flow another reaction component (e.g., a reagent) through the reagent cartridge 1202 that is thereafter received by the waste reservoir 1214 and/or otherwise exhausted by the reagent cartridge 1202. The reaction component performs a flushing operation that chemically cleaves the fluorescent label and the reversible terminator from the sstDNA. The sstDNA is then ready for another cycle.

Referring now to the drive assembly 1204, in the implementation shown, the drive assembly 124 includes a pump drive assembly 1222, a valve drive assembly 1224, and an actuator assembly 192. The pump drive assembly 1222 interfaces with a pump 1226 to pump fluid through the reagent cartridge 1202 and/or the flow cell 1220 and the valve drive assembly 1224 interfaces with a valve 1228 to control the position of the valve 1228. The interaction between the valve 1228 and the valve drive assembly 1224 selectively actuates the valve 1228 to control the flow of fluid through fluidic lines 1230 of the reagent cartridge 1202. One or more of the fluidic lines 1230 fluidically couple one or more reagent reservoirs 1232 and the flow cell 1220. One or more of the valves 1228 may be implemented by a valve manifold, a rotary valve, a pinch valve, a flat valve, a solenoid valve, a reed valve, a check valve, a piezo valve, etc.

Referring to the controller 1206, in the implementation shown, the controller 1206 includes a user interface 1234, a communication interface 1236, one or more processors 1238, and a memory 1240 storing instructions executable by the one or more processors 1238 to perform various functions including the disclosed implementations. The user interface 1234, the communication interface 1236, and the memory 1240 are electrically and/or communicatively coupled to the one or more processors 1238.

In an implementation, the user interface 1234 receives input from a user and provides information to the user associated with the operation of the system 1200 and/or an analysis taking place. The user interface 1234 may include a touch screen, a display, a key board, a speaker(s), a mouse, a track ball, and/or a voice recognition system. The touch screen and/or the display may display a graphical user interface (GUI).

In an implementation, the communication interface 1236 enables communication between the system 1200 and a remote system(s) (e.g., computers) via a network(s). The network(s) may include an intranet, a local-area network (LAN), a wide-area network (WAN), the intranet, etc. Some of the communications provided to the remote system may be associated with analysis results, imaging data, etc. generated or otherwise obtained by the system 1200. Some of the communications provided to the system 1200 may be associated with a fluidics analysis operation, patient records, and/or a protocol(s) to be executed by the system 1200.

The one or more processors 1238 and/or the system 1200 may include one or more of a processor-based system(s) or a microprocessor-based system(s). In some implementations, the one or more processors 1238 and/or the system 1200 includes a reduced-instruction set computer(s) (RISC), an application specific integrated circuit(s) (ASICs), a field programmable gate array(s) (FPGAs), a field programmable logic device(s) (FPLD(s)), a logic circuit(s), and/or another logic-based device executing various functions including the ones described herein.

The memory 1240 can include one or more of a hard disk drive, a flash memory, a read-only memory (ROM), erasable programmable read-only memory (EPROM), electrically erasable programmable read-only memory (EEPROM), a random-access memory (RAM), non-volatile RAM (NVRAM) memory, a compact disk (CD), a digital versatile disk (DVD), a cache, and/or any other storage device or storage disk in which information is stored for any duration (e.g., permanently, temporarily, for extended periods of time, for buffering, for caching).

ADDITIONAL CONSIDERATIONS

The foregoing description is provided to enable a person skilled in the art to practice the various configurations described herein. While the subject technology has been particularly described with reference to the various figures and configurations, it should be understood that these are for illustration purposes only and should not be taken as limiting the scope of the subject technology.

As used herein, an element or step recited in the singular and proceeded with the word "a" or "an" should be understood as not excluding plural of said elements or steps, unless such exclusion is explicitly stated. Furthermore, references to "one implementation" are not intended to be interpreted as excluding the existence of additional implementations that also incorporate the recited features. Moreover, unless explicitly stated to the contrary, implementations "comprising," "including," or "having" an element or a plurality of elements having a particular property may include additional elements whether or not they have that property. Moreover, the terms "comprising," including," having," or the like are interchangeably used herein.

The terms "substantially," "approximately," and "about" used throughout this Specification are used to describe and account for small fluctuations, such as due to variations in processing. For example, they can refer to less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%.

There may be many other ways to implement the subject technology. Various functions and elements described herein may be partitioned differently from those shown without departing from the scope of the subject technology. Various modifications to these implementations may be readily apparent to those skilled in the art, and generic principles defined herein may be applied to other implementations. Thus, many changes and modifications may be made to the subject technology, by one having ordinary skill in the art, without departing from the scope of the subject technology. For instance, different numbers of a given module or unit may be employed, a different type or types of a given module or unit may be employed, a given module or unit may be added, or a given module or unit may be omitted.

Underlined and/or italicized headings and subheadings are used for convenience only, do not limit the subject technology, and are not referred to in connection with the interpretation of the description of the subject technology. All structural and functional equivalents to the elements of the various implementations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

It should be appreciated that all combinations of the foregoing concepts and additional concepts discussed in greater detail below (provided such concepts are not mutually inconsistent) are contemplated as being part of the subject matter disclosed herein. In particular, all combinations of claimed subject matter appearing at the end of this disclosure are contemplated as being part of the subject matter disclosed herein.

What is claimed is:

1. An apparatus, comprising:
   a beam source for providing input radiation;
   a beam shaping group comprising one or more optical elements positioned to receive the input radiation from the beam source and to generate a beam having a long axis, and a short axis perpendicular to the long axis, and wherein the one or more optical elements comprises a modifier configured to perform beam shaping on the input radiation to broaden the beam in a direction along the short axis to form a shaped beam;
   an objective positioned to receive the shaped beam and to transform the shaped beam into a probe beam, the objective further configured to provide the probe beam to a focal plane of the objective for optically probing a sample,
   wherein the beam shaping group is configured to adjust one or more properties of the shaped beam over time to generally uniformly heat the objective over a region of incidence for the shaped beam.

2. The apparatus of claim 1, wherein the one or more optical elements are configured to form a substantially line-shaped beam at or near the focal plane of the objective, and wherein the modifier is further configured to change a beam offset for the shaped beam over time, such that, at different times, the shaped beam is made to be incident on the objective at different respective locations of the objective.

3. The apparatus of claim 2, wherein the modifier is configured to change the beam offset over time such that the probe beam is a substantially unchanged line-shaped beam at or near the focal plane of the objective at different beam offsets.

4. The apparatus of claim 2, wherein the modifier is at least one of a selectively tiltable pane of material, a mirror, a wedge, or a prism.

5. The apparatus of claim 2, wherein the beam shaping group is further configured for the modifier to periodically cycle the beam offset through a plurality of beam offsets.

6. The apparatus of claim 2, wherein the modifier is configurable to move the shaped beam back and forth across a transverse axis of the objective.

7. The apparatus of claim 2, wherein the modifier is configurable to orbit the shaped beam about an optical axis of the objective.

8. The apparatus of claim 2, wherein the beam offset may be in one or two directions.

9. The apparatus of claim 1, wherein the beam shaping group is configured to:
perform beam shaping on the input radiation to form a substantially line-shaped beam at or near the focal plane of the objective as the shaped beam during a first time period;
provide the shaped beam to the objective during the first time period;
perform beam shaping on the input radiation to form a broad beam as the shaped beam during a second different time period; and
provide the shaped beam to the objective during the second time period to pre-heat the objective.

10. The apparatus of claim 9, wherein the first time period corresponds to a time period of optical scanning of a sample, and wherein the second time period corresponds to a time period when optical scanning of a sample is not being performed.

11. The apparatus of claim 1, wherein the beam source is at least one of a laser, a laser diode, a diode-pumped solid-state laser, or a coherent light source.

12. An apparatus, comprising:
a beam source for providing input radiation;
a beam shaping group having:
one or more optical elements configured to receive the input radiation from the beam source and further configured to shape the input radiation into a first beam, the first beam having a long axis, and a short axis perpendicular to the long axis, and
a modifier configured to widen the first beam in a direction along the short axis of the first beam to generate a shaped beam; and
an objective configured and positioned to transform the shaped beam into a probe beam focused to a focal plane of the objective, wherein the objective is defocused such that the focal plane is further from the objective than a sample being optically probed,
wherein the modifier is configured to widen the first beam to generally uniformly illuminate the objective, and wherein the probe beam is a substantially line-shaped beam at or near the focal plane of the objective.

13. The apparatus of claim 12, wherein the one or more optical elements includes a Powell lens having a Powell axis, and the modifier expands the first beam along a non-Powell axis, the non-Powell axis being perpendicular to the Powell axis.

14. The apparatus of claim 12, wherein the modifier includes at least one of a cylindrical lens, a cylindrical telescope, an excitation cylindrical telescope, a defocus lens, a prism array, or a diffuser.

15. The apparatus of claim 12, wherein the beam source is at least one of a laser, a laser diode, a diode-pumped solid-state laser, or a coherent light source.

16. An apparatus, comprising:
a beam source configured to provide input radiation;
a multi-mode fiber configured to receive the input radiation from the beam source and to output radiation from an output of the multi-mode fiber, the output being at an output plane of the multimode fiber;
a beam shaping group having one or more optical elements including a modifier, the beam shaping group configured to (i) receive the output radiation from the multi-mode fiber, (ii) generate a beam having a long axis and a short axis perpendicular to the long axis, (iii) project an image of the output plane of the multi-mode fiber, the image having a long axis and a short axis, and (iii) (iv) expand, via the modifier, the image in one direction along the short axis; and
an objective configured to receive the image from the beam shaping group, and further configured to project the image to a focal plane of the objective.

17. The apparatus of claim 16, wherein the one or more optical elements includes at least one of a cylindrical microlens array, or a diffractive optical element.

18. The apparatus of claim 16, wherein the beam source is at least one of a laser, a laser diode, a diode-pumped solid-state laser, or a coherent light source.

19. A method of optically probing a sample, the method comprising:
providing, by a beam source, input radiation to a beam shaping group, the beam shaping group including one or more optical elements;
performing, by the beam shaping group, beam shaping of the input radiation and forming a shaped beam, the beam shaping group configured to generate the shaped beam having a long axis and wherein the one or more optical elements comprises a modifier configured to broaden the beam in a direction along the short axis to form the shaped beam; and
focusing, by an objective, the shaped beam to form a probe beam, the probe beam focused at a focal plane of the objective for optically probing a sample,
wherein the beam shaping group adjusts one or more properties of the shaped beam over time to generally uniformly heat the objective.

20. The method of claim 19, wherein the probe beam comprises a substantially line-shaped beam at or near the focal plane of the objective, and wherein the method further includes:
changing, by a modifier included in the beam shaping group, a beam offset of the shaped beam over time, such that, at different times, the shaped beam is incident on the objective at different respective locations of the objective.

21. The method of claim 20, wherein the modifier is configured to change the beam offset over time such that the probe beam is a substantially unchanged line-shaped beam at or near the focal plane of the objective at different beam offsets.

22. The method of claim 20, wherein the modifier comprises at least one of a selectively tiltable pane of material, a mirror, a wedge, or a prism.

23. The method of claim 20, wherein the method further comprises changing, by the beam shaping group, the beam offset by periodically cycling by controlling the modifier to periodically cycle the beam offset through a plurality of beam offsets.

24. The method of claim 20, wherein the modifier is configurable to move the shaped beam back and forth across a transverse axis of the objective or the modifier is configurable to orbit the shaped beam about an optical axis of the objective.

25. The method of claim 20, wherein the beam offset may be in one or two directions.

26. The method of claim 19, wherein the method further comprises:
performing, by the beam shaping group, beam shaping on the input radiation to form a substantially line-shaped beam at or near the focal plane of the objective during a first time period;
providing the shaped beam to the objective during the first time period;

performing, by the beam shaping group, beam shaping on the input radiation to form a broad beam at or near the focal plane of the objective during a second different time period; and providing the shaped beam to the objective during the second time period to pre-heat the objective, wherein the first time period corresponds to a time period of optical scanning of a sample, and wherein the second time period corresponds to a time period when optical scanning of a sample is not being performed.

* * * * *